(12) United States Patent
Birkmeyer et al.

(10) Patent No.: US 10,562,193 B2
(45) Date of Patent: Feb. 18, 2020

(54) AUTOMATIC MAGNETIC GRIPPER FOR NON-MAGNETIC OBJECTS

(71) Applicant: Dishcraft Robotics, Inc., San Carlos, CA (US)

(72) Inventors: Paul M. Birkmeyer, Redwood City, CA (US); Kenneth M. Peters, San Mateo, CA (US)

(73) Assignee: Dishcraft Robotics, Inc., San Carlos, CA (US)

( * ) Notice: Subject to any disclaimer, the term of this patent is extended or adjusted under 35 U.S.C. 154(b) by 241 days.

(21) Appl. No.: 15/684,654

(22) Filed: Aug. 23, 2017

(65) Prior Publication Data

US 2018/0056524 A1     Mar. 1, 2018

Related U.S. Application Data

(60) Provisional application No. 62/379,083, filed on Aug. 24, 2016.

(51) Int. Cl.
| | | |
|---|---|---|
| *B25J 15/06* | (2006.01) | |
| *B25B 11/00* | (2006.01) | |
| *B66C 1/06* | (2006.01) | |
| *H01F 1/04* | (2006.01) | |
| *H01F 1/14* | (2006.01) | |

(52) U.S. Cl.
CPC ......... *B25J 15/0608* (2013.01); *B25B 11/002* (2013.01); *B66C 1/06* (2013.01); *H01F 1/04* (2013.01); *H01F 1/14* (2013.01); *Y10S 901/40* (2013.01)

(58) Field of Classification Search
CPC .. B25J 15/0608; H01F 7/0247; H01F 7/0242; B25B 11/002
USPC ............................................... 414/797.1, 737
See application file for complete search history.

(56) References Cited

U.S. PATENT DOCUMENTS

| | | | |
|---|---|---|---|
| 6,002,184 A | 12/1999 | Delson | |
| 6,386,609 B1 | 5/2002 | Govzman | |
| 6,746,063 B1 * | 6/2004 | Sanchez | B21D 43/24 |
| | | | 271/18.1 |
| 7,784,603 B2 | 8/2010 | Burgmeier | |

FOREIGN PATENT DOCUMENTS

| | | | |
|---|---|---|---|
| EP | 2532475 | 12/2012 | |
| EP | 2532475 A2 * | 12/2012 | .......... B25J 15/0608 |

* cited by examiner

*Primary Examiner* — Gerald McClain
(74) *Attorney, Agent, or Firm* — Loza & Loza, LLP (57) ABSTRACT

A system for automatically magnetically gripping non-magnetic objects. The system includes a robotic arm, a magnetic actuator, and a free magnetic element. The magnetic actuator may be coupled to an end effector of the robotic arm. A non-magnetic object may be placed between the free magnetic element and the magnetic actuator. The magnetic actuator may magnetically attract the free magnetic element to securely grasp the non-magnetic object therebetween. A corresponding method is also disclosed and claimed herein.

21 Claims, 8 Drawing Sheets

AUTOMATIC MAGNETIC GRIPPER FOR NON-MAGNETIC OBJECTS

RELATED APPLICATION

This application claims the priority benefit of U.S. Provisional Application Ser. No. 62/379,083, entitled "Multi-Part Magnetic Gripper for Robot," filed on Aug. 24, 2016, the disclosure of which is hereby incorporated by reference herein in its entirety.

BACKGROUND

Field of the Invention

This invention relates to robotics, and more particularly, to magnetic grippers for robotics.

BACKGROUND OF THE INVENTION

In robotics, grippers are commonly implemented as end effectors to grasp, hold, and/or move objects or tools. While there are many different types of grippers, magnetic grippers are often preferred as they can handle a variety of material sizes, are reliable, and grasp quickly. Additionally, magnetic grippers allow for easy grasping of a wide range of product shapes, including items with holes. Magnetic grippers may also be preferred due to their low maintenance requirements. The advantages and features of magnetic grippers make them a natural fit for applications such as scrap metal salvage, where powerful electromagnets mounted on cranes coarsely attract metal objects.

Despite the advantages associated with magnetic grippers, however, such grippers are not always feasible for contemplated or desired applications. For example, since magnetic grippers rely on magnetic forces to attract and retain an object, they are typically reserved for objects having ferromagnetic qualities. Thus, many robotic systems that could benefit from the advantages inherent in magnetic grippers, such as commercial dishwashing applications, are unable to utilize them due to the non-magnetic nature of the objects to be moved.

Accordingly, what are needed are systems and methods for automatically magnetically gripping non-magnetic objects. Ideally, such systems and methods would achieve rapid and reliable engagement of non-magnetic objects having a variety of shapes and sizes. Such systems and methods would also automatically analyze an object to determine an optimal grasping location or technique for optimizing a grasp on the object, and then grasp the object accordingly. Finally, such systems and methods would facilitate quick and effective release of an object from the gripper as desired.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
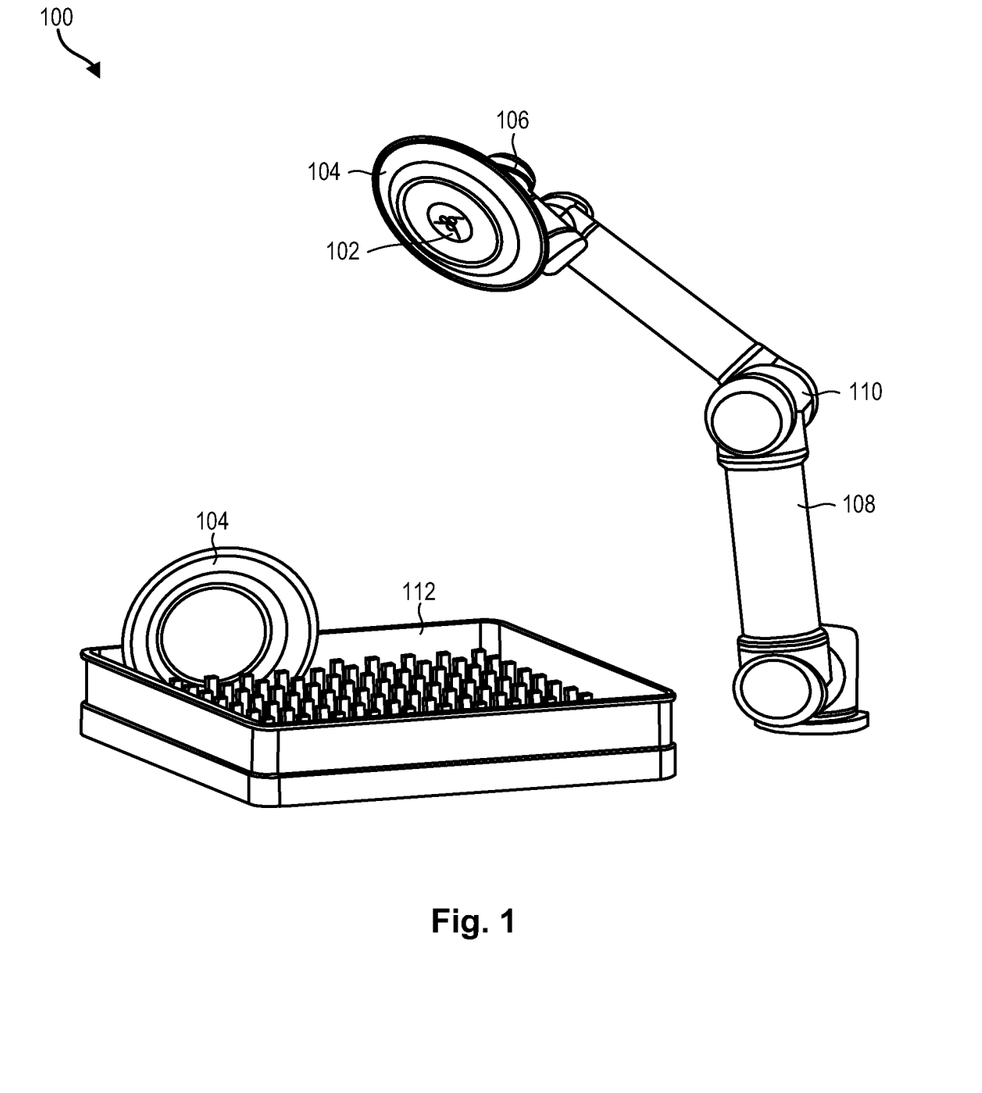
FIG. 1 is a perspective view of one embodiment of an automatic magnetic gripper for non-magnetic objects in accordance with the invention.

Referring to FIG. 1, high-volume commercial dishwashing industries require high-throughput of dishes along an assembly line-type cleaning system. To this end, robotics are often implemented to facilitate rapid movement of dishes from one location to another. The efficiency of such robots may be inherently limited, however, by their associated gripping mechanisms. Indeed, such gripping mechanisms typically require multiple steps and time to ensure an adequate grasp on a dish prior to moving it from one location to another along the conveyor.

Parallel grippers, for example, require that dishes be first oriented such that the gripper may cleanly and easily grasp an edge of the dish. This preparatory step may considerably lengthen the time needed to complete a dishwashing cycle. Similarly, digitated or anthropomorphic grippers are complicated to control, requiring additional time and resources to effectively program and operate. The design of such grippers may also inherently limit their ability to reliably support the weight of a dish. Indeed, the effectiveness of such grippers may be limited by their associated finger strength.

As shown in FIG. 1, embodiments of the present invention may avoid some of the limitations set forth above by enabling automatic magnetic gripping of non-magnetic objects. In one embodiment, an automatic magnetic gripper 100 for grasping a non-magnetic object in accordance with the invention may include a free magnetic element 102, a magnetic actuator 106, and a robot 108. In certain embodiments, the robot 108 may be a fixed mount, articulated robotic arm mounted to a work surface, and may operate in connection with the magnetic actuator 106 and free magnetic element 102 to move a dish 104 or other non-magnetic object from one location to another.

The robot 108 may comprise an articulated robot, a gantry robot, a SCARA robot, a delta robot, or other robotic transit mechanism known to those in the art. In some embodiments, the robot 108 may be articulated to include one or more joints 110. In this manner, the robot 108 may permit multiple degrees of freedom to grasp, transfer and orient a dish 104 as needed from one position and/or location to another. For example, in one embodiment, an automatic magnetic gripper 100 in accordance with the invention may grasp a horizontally-placed dirty dish 104 from a conveyor belt and transfer it to a substantially vertical position in a dishwashing rack 112 for washing and/or sanitizing. Likewise, an automatic magnetic gripper 100 may grasp a clean dish 104 disposed vertically in a cleaning rack 112, and stack it in a horizontal position on a shelf or other location for future use.

The magnetic actuator 106 may be coupled to or integrated with the robot 108 such that the magnetic actuator 106 may be an end-effector thereof. In certain embodiments, the magnetic actuator 106 and robot 108 may be sealed in a substantially monolithic structure to facilitate cleaning and use. The magnetic actuator 106 may include electromagnets or permanent magnets to provide extremely reliable, strong, and predictable magnetic forces to attract and release one or more free magnetic elements 102 as desired.

A free magnetic element 102 may include any ferromagnetic metal or material such as steel, iron, iron powder, or the like. As discussed in more detail with reference to FIGS. 2-4 below, a free magnetic element 102 may include a shape such as a disk, a wedge, a plate, an amorphous shape, or any other fixed or flexible shape known to those in the art to facilitate magnetically grasping a non-magnetic object between the magnetic actuator 106 and the free magnetic element 102.

In one embodiment, for example, the free magnetic element 102 may comprise a flexible membrane containing iron powder. In this manner, the free magnetic element 102 may mold itself to follow the contours of the non-magnetic object. Further, in certain embodiments, the free magnetic element 102 may be substantially encased in a high-friction material, such as a soft thermoplastic polyurethane (TPU) molded over a steel core, to allow compliance and improve friction in the grip.

As shown, the automatic magnetic gripper 100 may be actuated such that the magnetic actuator 106 attracts a free magnetic element 102, such as a disk magnet, located beneath a dish 104. The free magnetic element 102 may be coupled to or integrated with the dish 104, or may simply be placed beneath the dish 104. Upon application of a magnetic force, the magnetic actuator 106 may attract the free magnetic element 102 beneath the dish 104, thereby grasping the dish 104 and retaining it between the magnetic actuator 106 and the free magnetic element 102. The robot 108 may then be actuated to move the dish 104 and place it into a rack 112 for cleaning or sanitizing.

As shown, embodiments of the invention apply large, predictable magnetic forces between the magnetic actuator 106 and the free magnetic element 102 to achieve a reliable, stable grip of a non-magnetic object, such as a dish 104, therebetween. Since magnetic attractive forces occur over a wide area, embodiments of the invention may require reduced precision in positioning the automatic magnetic gripper 100 relative to a non-magnetic object. Indeed, application of a magnetic field may cause the free magnetic element 102 to self-align with the magnetic actuator 106.

Figure 2A:
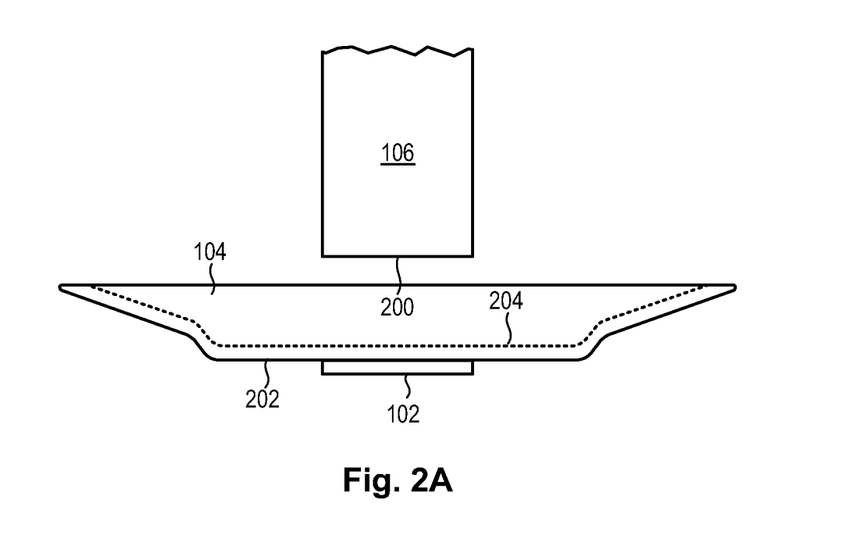
FIG. 2A is a side cutaway view of one embodiment of an automatic magnetic gripper positioned to grasp a dinner plate between a magnetic actuator and a free magnetic element.

Referring now to FIG. 2A, one embodiment of an automatic magnetic gripper 100 in accordance with the invention may include a disk-shaped free magnetic element 102. Alternatively, the free magnetic element 102 may be in the shape of a cross, a wedge, a plate, an amorphous shape, or any other shape known to those in the art.

In some embodiments, the robot 108 may first analyze the object to determine optimal shape and size characteristics for an associated free magnetic element 102 to achieve an optimal grasp on the object. The robot 108 may then intelligently select a free magnetic element 102 having shape and/or size characteristics to provide the greatest benefit when grasping the object. In some embodiments, the robot 108 may place the selected free magnetic element 102 on a work surface to facilitate appropriate positioning of the object relative thereto, as discussed in more detail below. In other embodiments, the robot 108 may simply identify a free magnetic element 102 having optimal shape and/or size characteristics to enable another robot or human operator to select and/or place an appropriate free magnetic element 102 accordingly.

The free magnetic element 102 may be placed beneath a dinner plate or other dish 104 such that a first surface 202 of the dish 104 is substantially adjacent to, and may contact, the free magnetic element 102. In some embodiments, the free magnetic element 102 may be substantially sealed or encapsulated in a thermoplastic elastomer such as TPU to facilitate cleaning and sterilization, as needed. The free magnetic element 102 may include continuous, smooth external contours to facilitate a stable interface between the first surface 202 of the dish 104 and the free magnetic element 102, as well as to permit the free magnetic element 102 to move freely as needed to self-align with the magnetic actuator 106, as previously mentioned.

In some embodiments, the free magnetic element 102 may include an adhesive or other such mechanism or substance to removably affix the free magnetic element 102 to the first surface 202 of the dish 104 upon contact. In other embodiments, the free magnetic element 102 may include a shape designed to engage a corresponding cutout in the first surface 202 of the dish 104, thereby facilitating a press-fit interface between the free magnetic element 102 and the dish 104.

In one embodiment, the magnetic actuator 106 may be a magnetic linear cylinder. An end 200 of the magnetic actuator 106 may be positioned to substantially correspond to a second surface 204 of the dish 104. The second surface 204 of the dish 104 may be substantially opposite the first surface 202 of the dish 104, such that a vertical position of the magnetic actuator 106 substantially corresponds to the free magnetic element 102 located under the dish 104. Upon application of a magnetic force, the free magnetic element 102 may substantially self-align with the magnetic actuator 106, thus facilitating a secure grasp of the dish 104 therebetween.

Figure 2B:
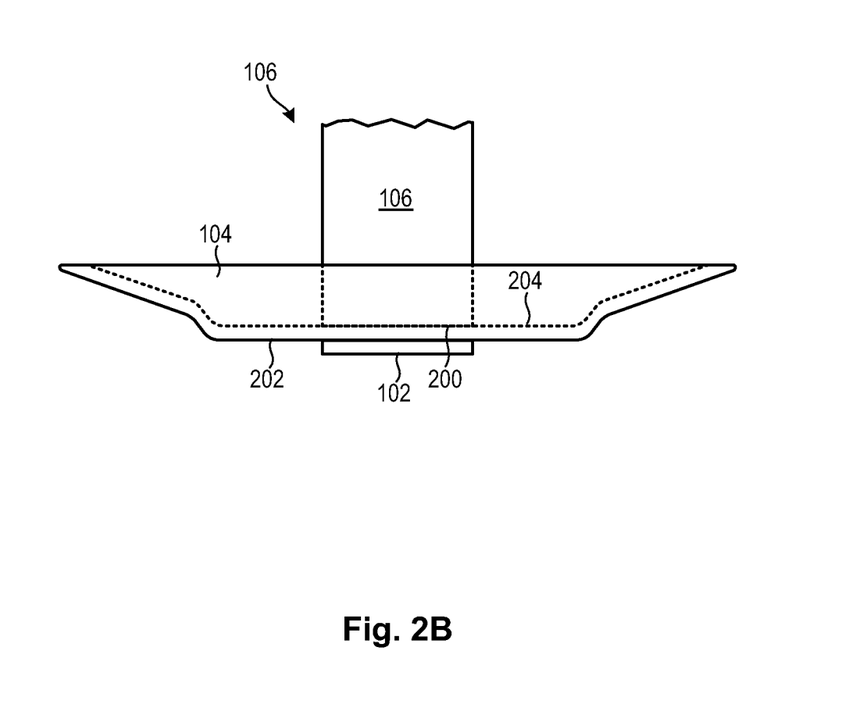
FIG. 2B is a side cutaway view of the embodiment of FIG. 2A actuated to grasp a dinner plate in accordance with the invention.

Referring now to FIG. 2B, the robot 108 may be actuated to reduce the distance between the magnetic linear cylinder 200 or other magnetic actuator 106 and the free magnetic element 102. Magnetic forces may be applied by the magnetic actuator 106 to draw the free magnetic element 102 toward the magnetic actuator 106 such that the magnetic actuator 106 surface contacts the second surface 204 of the dish 104 or other non-magnetic object. In this manner, the dish 104 may be securely grasped and retained between the magnetic actuator 106 and the free magnetic element 102.

Figure 3A:
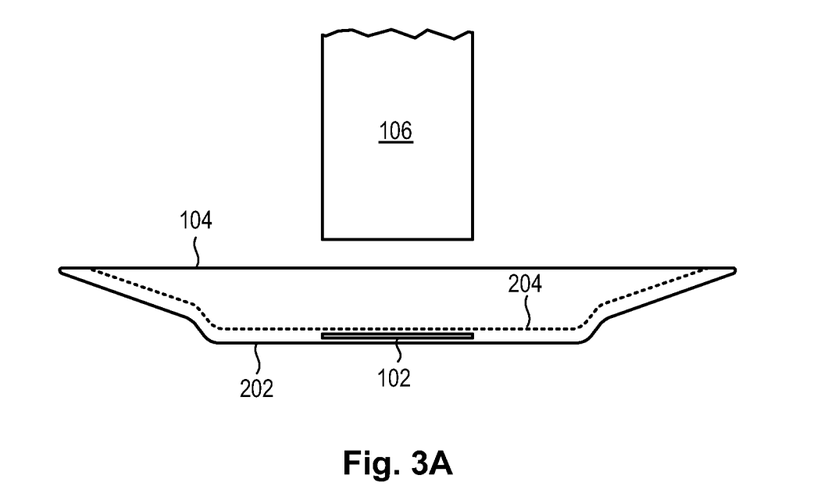
FIG. 3A is a side cutaway view of another embodiment of an automatic magnetic gripper positioned to grasp a dinner plate having a free magnetic element coupled thereto in accordance with the invention.

Referring now to FIG. 3A, in an alternative embodiment, a dish 104 or other non-magnetic object may be customized or modified to accommodate a free magnetic element 102. This embodiment may promote efficiency and ease of use in environments where the dish 104 is part of an inventory of dishes 104 or other objects that may be repeatedly grasped by the automatic magnetic gripper 100 or cycled through a system implementing an automatic magnetic gripper 100 in accordance with the invention.

Customizing the dish 104 in this manner may also enable the free magnetic element 102 to be visually innocuous by being partially or completely hidden from view. Alternatively, the free magnetic element 102 may be integrated into the dish 104 in an aesthetically pleasing manner. As shown, the free magnetic element 102 is incorporated into the dish 104 such that it is hidden from view from both the first surface 202 and the second surface 204. A portion of the dish 104 may fully or partially cover the free magnetic element 102 and, in some embodiments, may be selectively removable.

In certain embodiments, a size and shape of a free magnetic element 102 may substantially correspond to a pocket or cutout in the first surface 202 of the dish 104. The corresponding pocket or cutout may be substantially centered with respect to the dish 104, or may be otherwise located at a position on the dish 104 to optimize a grasp thereof. Application of a magnetic field may cause the free magnetic element 102 to engage the corresponding cutout in the dish 104, thereby obscuring the free magnetic element 102 from view.

Figure 3B:
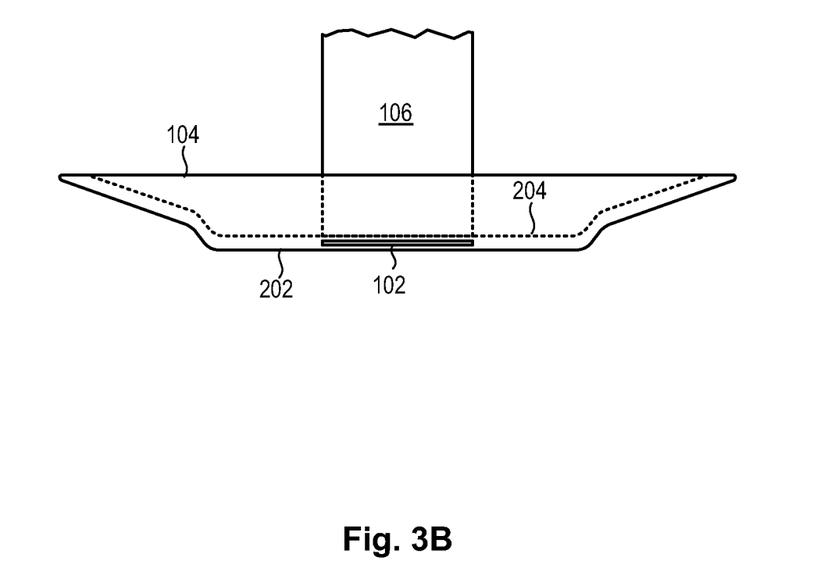
FIG. 3B is a side cutaway view of the embodiment of FIG. 3A actuated to grasp the dinner plate.

The magnetic actuator 106 may engage the dish 104 by applying magnetic forces to draw the free magnetic element 102 coupled to the dish 104 toward the magnetic actuator 106. The magnetic actuator 106 may then contact the second surface 204 of the dish 104 to automatically magnetically grasp the dish 104 and allow it to be moved from one location to another, as shown in FIG. 3B.

Figure 4A:
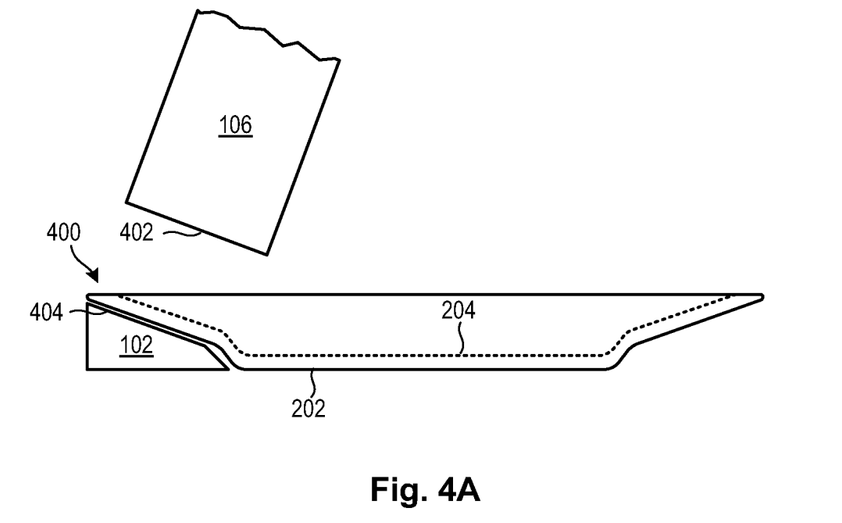
FIG. 4A is a side cutaway view of a third embodiment of an automatic magnetic gripper positioned to grasp an edge of a dinner plate in accordance with the invention.
Figure 4B:
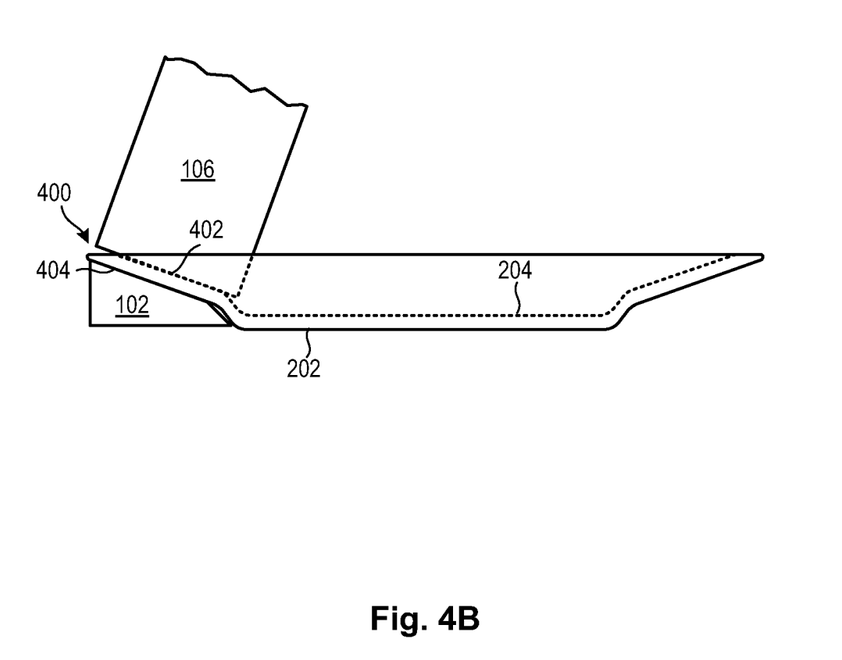
FIG. 4B is a side cutaway view of the embodiment of FIG. 4A actuated to grasp the edge of the dinner plate.

Referring now to FIGS. 4A and 4B, another embodiment of the present invention may include an automatic magnetic gripper 100 configured to grasp an edge 400 of a dish 104, such as a dinner plate. In this embodiment, a free magnetic element 102 may be wedge-shaped to allow the sloped side 404 of the free magnetic element 102 to create a substantially stable interface between the free magnetic element 102 and the dish 104.

In operation, the wedge-shaped free magnetic element 102 may be placed on a work surface. A dish 104 may be placed adjacent to the free magnetic element 102 such that the edge 400 of the dish 104 substantially corresponds to the slope 404 of the free magnetic element 102. The magnetic actuator 106 may be actuated to approach the free magnetic element 102. In this manner, the end 402 of the magnetic actuator 106 may substantially align with the slope 404 of the free magnetic element 102. The end 402 of the magnetic actuator 106 may contact the second surface 204 of the dish 104 at a location substantially corresponding to a location where the slope 404 of the free magnetic element 102 contacts the first surface 202 of the dish 104. The edge 400 of the dish 104 may thus be firmly grasped between the magnetic actuator 106 and the free magnetic element 102 to allow the dish 104 to be moved by the robot 108 with minimal risk of dish 104 breakage.

In some embodiments, either or both of the free magnetic element 102 and the end 402 of the magnetic actuator 106 may include a roughened surface, or may be coated with a thermoplastic elastomer or other material or substance to maximize the mechanical interface between the free magnetic element 102 or magnetic actuator 106 and the dish 104. In certain embodiments, an adhesive substance may be applied to one or both of the slope 404 of the free magnetic element 102 and the end 402 of the magnetic actuator 106 for the same purpose.

The grip between the free magnetic element 102 and the magnetic actuator 106 may be quickly and easily released by selectively deactivating the magnetic field as desired.

Figure 5:
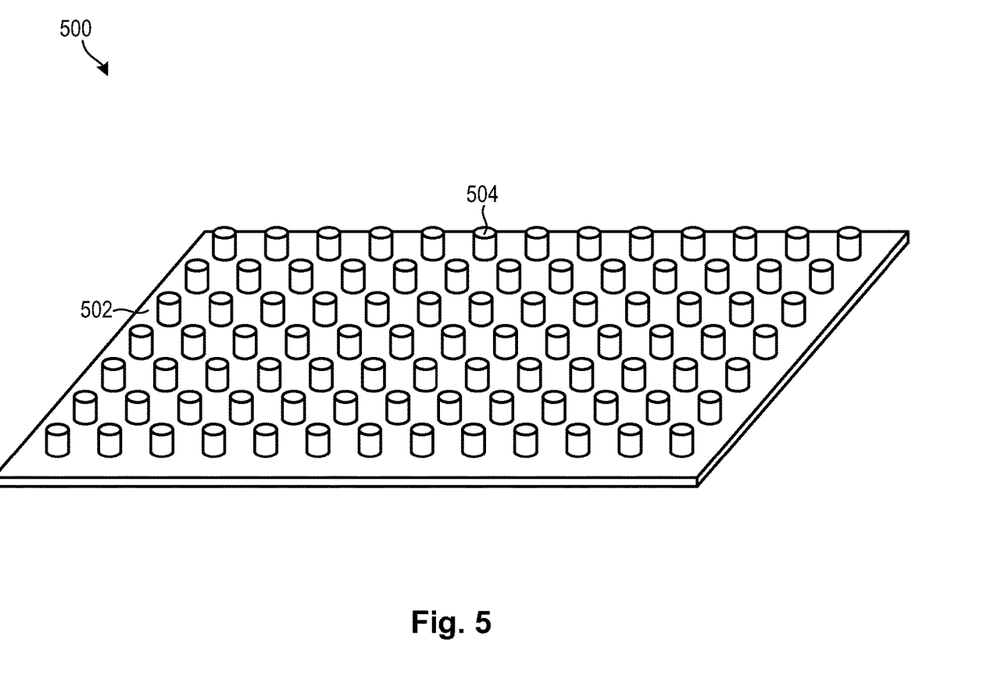
FIG. 5 is a perspective view of a structured surface to retain free magnetic elements in accordance with certain embodiments of the invention.

Referring now to FIG. 5, in some embodiments, a work surface 500 may be structured to retain one or more free magnetic elements 102 of an automatic magnetic gripper 100. For example, in one embodiment, the work surface 500 may include a mat 502 with multiple regularly-spaced protrusions 504. The protrusions 504 may be flexible to allow a free magnetic element 102 to be placed and retained within the spaces between the protrusions 504. Likewise, the protrusions 504 may easily flex to permit quick and easy release of a retained free magnetic element 102 by a magnetic actuator 106. In some embodiments, the mat 502 and the protrusions 504 may be integrally formed from rubber or another elastomeric material known to those in the art to facilitate ease of use and cleaning.

Protrusions 504 may have substantially equal heights and may be spaced from each other so as to create a relatively flat surface raised above the level of the mat 502. Distances between adjacent protrusions 504 may allow the top ends of the protrusions 504 to collectively support the weight of an object placed thereon. In this manner, one or more free magnetic elements 102 may be placed within the spaces between adjacent protrusions 504 at the base level, such that the free magnetic elements 102 lie directly on top of the mat 502 and the protrusions 504 extend vertically beyond the height of the free magnetic elements 102. One or more non-magnetic objects may then be disposed on and supported by the raised surface created by the top ends of the protrusions 504, such that the non-magnetic objects are suspended above the mat 502 and the free magnetic elements 102.

Figure 6:
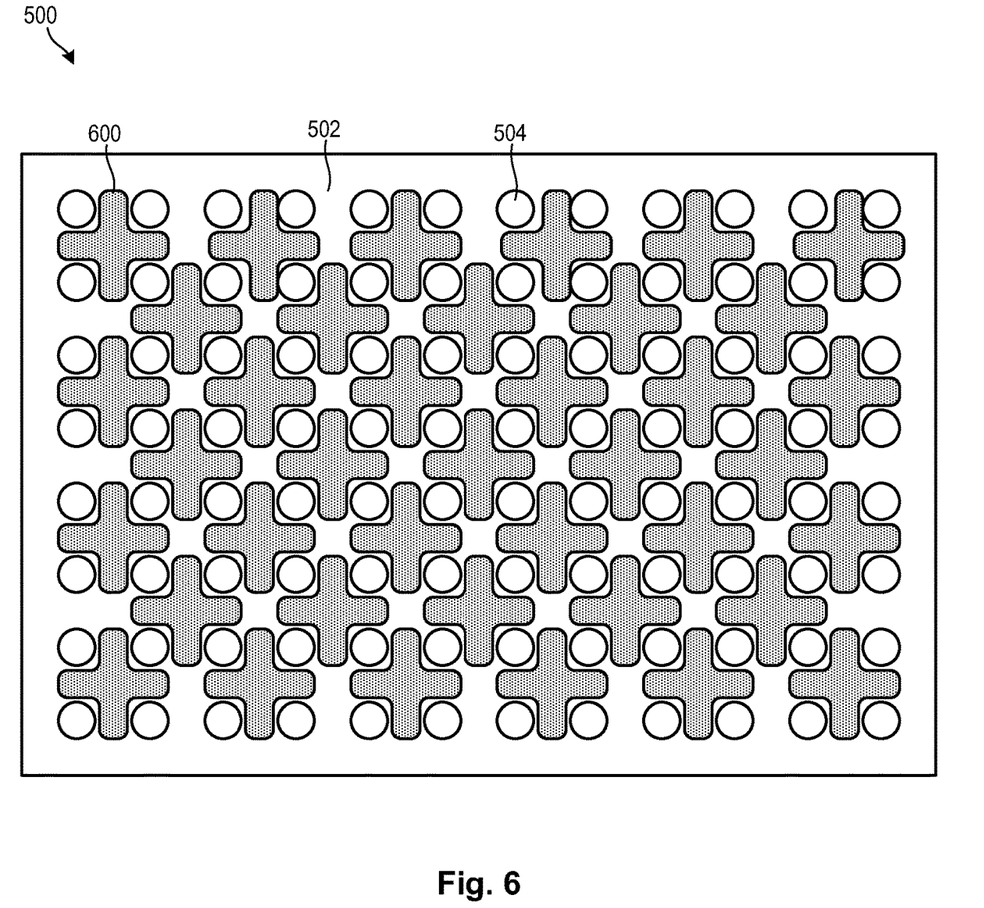
FIG. 6 is a top view of the structured surface of FIG. 5 having free magnetic elements disposed thereon.

As shown in FIG. 6, for example, adjacent protrusions 504 may be arranged in a grid-like pattern to substantially cover all or part of the mat 502. Spaces between adjacent protrusions 504 may be substantially equidistant, and may be proportioned to accommodate cross-shaped free magnetic elements 102 placed therein. Many cross-shaped free magnetic elements 600 may be placed on the mat 502 within such spaces, thereby facilitating the ability of the magnetic actuator 106 to substantially align with the one of the free magnetic elements 600, and reducing the degree of accuracy needed when placing a non-magnetic object relative to a free magnetic element 102.

The availability of many cross-shaped free magnetic elements 600 to provide a grip on the object increases the ability of the automatic magnetic gripper 100 to achieve an optimal grip on the object. For example, in one embodiment, the availability of many cross-shaped free magnetic elements 600 retained on the mat 502 increases the opportunities for the robot 108 to move the magnetic actuator 106 to a location where an object is centered directly above a particular cross-shaped free magnetic element 600. In this manner, the automatic magnetic gripper 100 of the present invention may optimize reliability of the resulting grip by minimizing the moment of inertia of the object.

Of course, the grid-like arrangement of protrusions 504 shown in FIG. 6 may also accommodate free magnetic elements 102 having other shapes. In some embodiments, for example, the mat 502 and protrusions 504 may accommodate disk-shaped free magnetic elements 102, linear free magnetic elements 102, polygonal free magnetic elements 102, and the like.

The arrangement, shaping, and/or spacing of protrusions 504 on a mat 502 may also be varied as desired to accommodate any of a variety of sizes and shapes of free magnetic elements 102. In certain embodiments, a single mat 502 may include more than one arrangement of protrusions 504, or may include protrusions 504 having varying shapes and characteristics, to maximize the types of free magnetic elements 102 that may be retained thereby. Further, embodiments of the present invention are not limited to using only one free magnetic element 102 at a time. More than one type or shape of free magnetic element 102 may be placed on a work surface 500 to enable the robot 108 or other operator to intelligently select one or more free magnetic elements 102 depending on advantages specific to different grasping situations.

Figure 7:
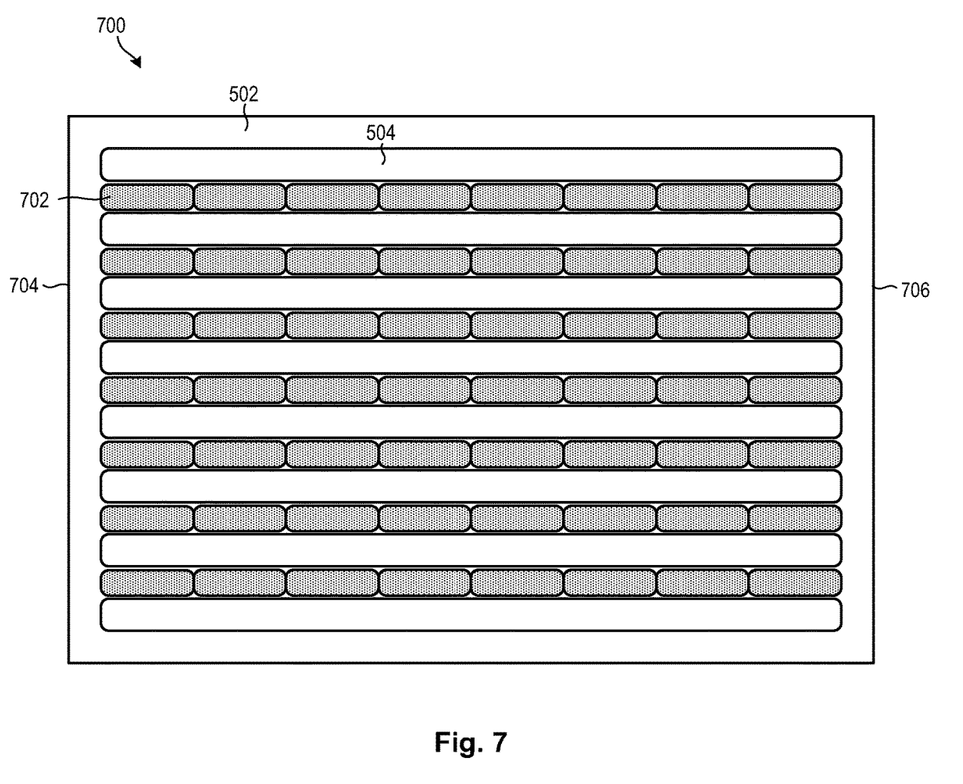
FIG. 7 is a top view of an alternative embodiment of a structured surface with free magnetic elements disposed thereon.

As shown in FIG. 7, in one embodiment, a mat 502 may include elongated protrusions 504 extending fully or partially along a length of the mat 502. Adjacent protrusions 504 may run substantially parallel to each other, and may be separated by a space sufficient to accommodate one or more elongated free magnetic elements 702.

In certain embodiments, multiple elongated free magnetic elements 702 may be placed end-to-end to substantially fill a space between adjacent protrusions 504. In a conveyor-type system 700, elongated free magnetic elements 702 may be added at a first end 704 of the mat 502 or conveyor as unused elongated free magnetic elements 702 are released or pushed out from a second end 706. In this manner, dishes 104 or other non-magnetic objects may be loaded onto the mat 502 or conveyor without regard to placement precision or accuracy, since a first surface 202 each loaded dish 104 will necessarily be substantially adjacent to at least one elongated free magnetic element 702.

Figure 8:
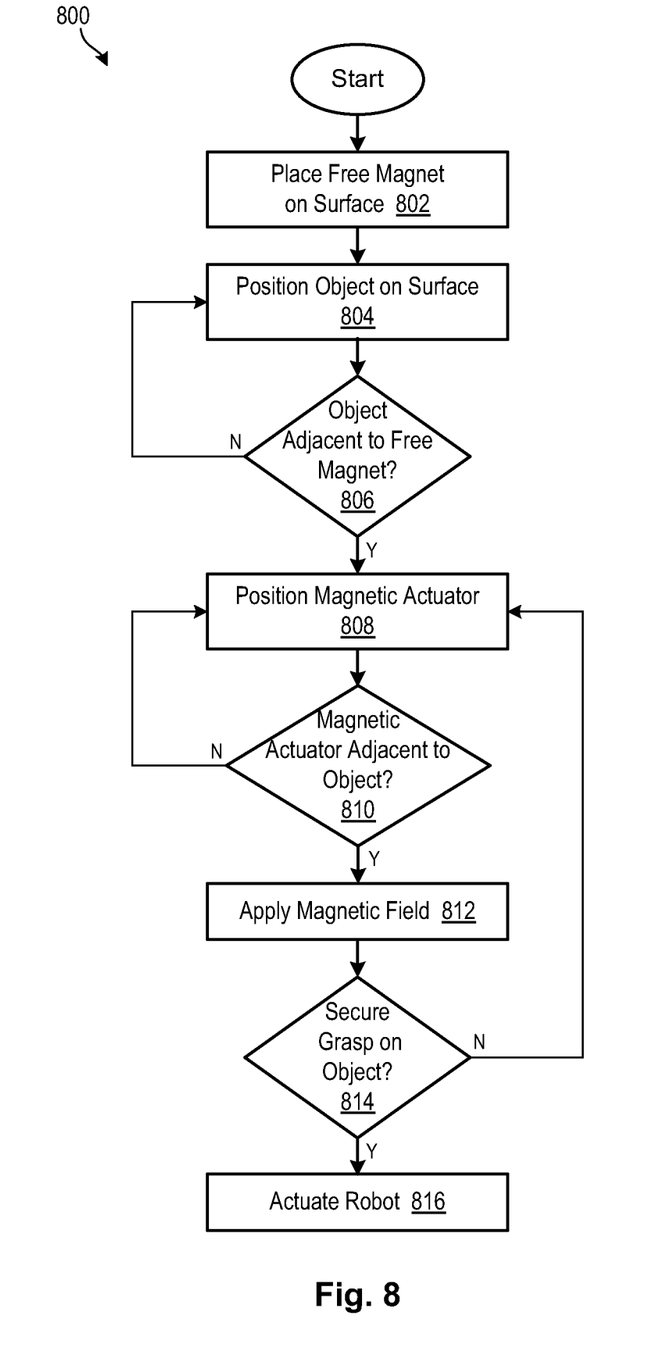
FIG. 8 is a flow chart depicting a process for automatically magnetically gripping a non-magnetic object in accordance with embodiments of the invention.

Referring now to FIG. 8, in operation, a robot may deploy freely movable magnetic elements to complete an automatic magnetic gripper for grasping and moving dishes and other non-magnetic objects. In accordance with this process 800, the robot or other operator may first place one or more free magnetic elements on a work surface 802. A dish or other non-magnetic object may then be placed on the work surface 804. The process 800 may then query whether the non-magnetic object is adjacent to at least one free magnetic element 806. If not, the object may be re-positioned on the work surface 804 such that it is disposed adjacent to a free magnetic element.

If yes, the magnetic actuator may be positioned 808. The process 800 may then query whether the magnetic actuator is properly positioned adjacent to the non-magnetic object 810 and substantially aligned with a free magnetic element. If not, the magnetic actuator may be re-positioned 808. If yes, a magnetic field may be applied 812 between the magnetic actuator and the free magnetic element to grasp the non-magnetic object therebetween.

The process 800 may then query whether the grasp on the non-magnetic object is secure 814. If not, the magnetic actuator may be re-positioned to achieve a better grasp 808. If yes, the robot may be actuated 816 to transfer the non-magnetic object from one location to another.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method, comprising:
    positioning a first side of a non-magnetic object substantially adjacent to a free magnetic element that is held in a structured surface in a predetermined position relative to the object, wherein the structured surface comprises rows of protrusions, and wherein multiple free magnetic elements are placed in spaces between the rows of protrusions;
    positioning a second side of the non-magnetic object to substantially correspond to an end effector of a robot, wherein the second side of the non-magnetic object is substantially opposite the first side, and wherein a magnetic actuator is coupled to the end effector of the robot;
    applying a magnetic field to the magnetic actuator to securely grasp the non-magnetic object between the magnetic actuator and the free magnetic element; and
    actuating the robot to move the non-magnetic object.

2. The method of claim 1, wherein positioning the first side of the non-magnetic object comprises determining at least one optimal grasp point of the non-magnetic object to minimize the moment of inertia of the non-magnetic object.

3. The method of claim 2, wherein positioning the first side of the non-magnetic object comprises positioning the at least one optimal grasp point substantially adjacent to the free magnetic element.

4. The method of claim 1, further comprising substantially automatically aligning the free magnetic element with the magnetic actuator.

5. The method of claim 1, wherein the robot comprises a multi-degree of freedom robotic arm.

6. The method of claim 1, wherein the free magnetic element comprises a shape selected from the group consisting of a disk, a wedge, and a cross.

7. The method of claim 1, wherein at least one of the free magnetic element and the magnetic actuator is coated with a high-friction material.

8. The method of claim 1, further comprising removably coupling the free magnetic element to the non-magnetic object.

9. The method of claim 1, further comprising automatically placing the free magnetic element on the structured surface to facilitate positioning the first side.

10. The method of claim 1, further comprising deactivating the magnetic field to release the non-magnetic object.

11. The method of claim 1, wherein the free magnetic elements in the spaces between the rows of protrusions are elongated free magnetic elements that are placed in multiple different parallel rows between the rows of protrusions.

12. The method of claim 11, wherein the free magnetic elements are placed end-to-end in the multiple different parallel rows between the rows of protrusions.

13. The method of claim 12, wherein the free magnetic elements are moved along in the multiple different rows by a conveyor system.

14. The method of claim 13, wherein the non-magnetic object comprises a dish and wherein dishes are loaded onto the conveyor system such that each loaded dish is adjacent to at least one of the multiple elongated free magnetic elements.

15. A method, comprising:
positioning a first side of a non-magnetic object substantially adjacent to a free magnetic element that is held in a structured surface in a predetermined position relative to the object, wherein the structured surface comprises rows of protrusions, and wherein multiple free magnetic elements are placed end-to-end in rows to substantially fill spaces between the rows of protrusions;
positioning a second side of the non-magnetic object to substantially correspond to an end effector of a robot, wherein the second side of the non-magnetic object is substantially opposite the first side, and wherein a magnetic actuator is coupled to the end effector of the robot;
applying a magnetic field to the magnetic actuator to securely grasp the non-magnetic object between the magnetic actuator and the free magnetic element; and actuating the robot to move the non-magnetic object.

16. The method of claim 15, wherein the free magnetic elements in the spaces between the rows of protrusions are elongated free magnetic elements that are placed in multiple different parallel rows between the rows of protrusions.

17. The method of claim 16, wherein the free magnetic elements are moved along in the multiple different parallel rows by a conveyor system.

18. The method of claim 17, wherein the non-magnetic object comprises a dish and wherein dishes are loaded onto the conveyor system such that each loaded dish is adjacent to at least one of the multiple elongated free magnetic elements.

19. A method, comprising:
positioning a first side of a non-magnetic dish substantially adjacent to a free magnetic element that is held in a structured surface of a conveyor system in a predetermined position relative to the dish, wherein the structured surface comprises rows of protrusions, and wherein multiple free magnetic elements are placed in spaces between the rows of protrusions;
positioning a second side of the non-magnetic object to substantially correspond to an end effector of a robot, wherein the second side of the non-magnetic object is substantially opposite the first side, and wherein a magnetic actuator is coupled to the end effector of the robot;
applying a magnetic field to the magnetic actuator to securely grasp the non-magnetic object between the magnetic actuator and the free magnetic element; and actuating the robot to move the non-magnetic object.

20. The method of claim 19, wherein the free magnetic elements in the spaces between the rows of protrusions are elongated free magnetic elements that are placed in multiple different parallel rows between the rows of protrusions.

21. The method of claim 20, wherein the free magnetic elements are placed end-to-end in the multiple different parallel rows.

* * * * *